United States Patent [19]
Meyer et al.

[11] 3,772,037
[45] Nov. 13, 1973

[54] STATIC BED AGGLOMERATION

[75] Inventors: William J. Meyer, Orangeburg; Boleslaw Sienkiewicz, Pearl River; John J. Byrwa, Yonkers, all of N.Y.

[73] Assignee: General Foods Corporation, White Plains, N.Y.

[22] Filed: Oct. 4, 1971

[21] Appl. No.: 186,561

[52] U.S. Cl............... 426/453, 99/DIG. 4, 23/313,
[51] Int. Cl. ............................................... A23f 1/04
[58] Field of Search........................... 99/DIG. 4, 71; 23/313; 264/118

[56] References Cited
UNITED STATES PATENTS

| | | | |
|---|---|---|---|
| 3,615,670 | 10/1971 | Sienkiewicz | 99/DIG. 4 |
| 3,433,644 | 3/1969 | Ganske et al. | 99/DIG. 4 |
| 3,506,457 | 4/1970 | Gidlow et al. | 99/DIG. 4 |
| 3,306,958 | 2/1967 | Gidlow | 99/DIG. 4 |
| 3,527,647 | 9/1970 | Hager | 99/DIG. 4 |

*Primary Examiner*—Frank W Lutter
*Assistant Examiner*—William L. Mentlik
*Attorney*—Thomas R. Savoie et al.

[57] ABSTRACT

A method for agglomerating particles of pulverulent food material wherein a static bed of particles is subjected to a hot humid atmosphere sufficient to fuse the static bed into a compacted fused sheet. The fused sheet may be ground to produce strong hard agglomerates of any desired particle size.

5 Claims, No Drawings

STATIC BED AGGLOMERATION

BACKGROUND OF THE INVENTION

In many agglomeration processes the particles to be agglomerated are caused to become sticky or tacky and then caused to contact one another. Various means of tackifying and contacting the particles to be agglomerated are known in the art.

A common technique of agglomeration involves spraying a stream of falling particles with steam, water or a mixture of steam and air. Agglomeration occurs after or while the particles are passing through the spray due to the numerous collisions of the moist sticky particles. After the agglomerates are formed they are usually dried and cooled in an air stream. Such a technique is described in U.S. Pat. No. 3,143,428 to Riemers et al. and U.S. Pat. No. 3,527,647 to Hager.

Another agglomeration technique involves the use of hot humidified air flows to at least partially fluidize a moving bed of particles. The particles are tackified by means of the hot humid air, and collisions caused by the fluidization produce agglomerates. The agglomerates are then dried and cooled usually by means of separate air streams. Such a process is described in U.S. Pat. No. 3,306,958 to Gidlow, U.S. Pat. No. 3,433,644 to Ganske et al. and U.S. Pat. No. 3,471,603 to Patrick et al.

The prior art processes generally require rather large equipment in order to handle the large air flows inherently used in the processes, and these processes yield a significant amount of fine or unagglomerated material. Very often the material to be agglomerated must be pretreated before it can be agglomerated by falling through a wet spray; pretreatment may include grinding and/or chilling of the particles. Techniques which involve the use of fluidized beds present the problem of recovering particles entrained in the air flows.

SUMMARY OF THE INVENTION

It has now been discovered that particles of pulverulent food material, even those materials which possess a relatively low moisture content of from 1% to 5%, may be agglomerated, without the addition of large amounts of moisture, by means of a static bed. According to this invention a static bed of particles is subjected to a hot humid atmosphere which causes the bed to fuse into a rigid sheet of material. This rigid sheet may then be ground to desired particle sizes.

Agglomeration may be caused to take place with the addition of not more than 1.5% by weight of water to the particles. This enables the process of this invention to proceed with a minimum of drying. Additionally, since the moisture addition is so low and no fluidization is necessary to promote agglomeration, both agglomeration and drying may take place in the same compartment.

The process of this invention may be conducted as either a batch or continuous process. A typical continuous process could convey the static bed through a fusion zone on a continuous conveyor such as a non-porous metal belt or a metal screen.

DETAILED DESCRIPTION OF THE INVENTION

The process of this invention is particularly adapted for the agglomeration of materials which tend to have plastic properties when exposed to a hot humid atmosphere, such that particles in contact with each other will be able to fuse together. As used in this invention, fusion is synonymous with melting, welding or coalescing of the particles at the various contact points of these particles when the surface temperature is raised above its thermoplastic point.

Inherent in this process is the fact that when the static bed of particles is caused to agglomerate by fusion the bed will compact to produce a relatively dense, hard sheet of material; however, conditions are controlled so that the sheet will maintain a porous character and not melt into a solid slab. The fused sheet may be subsequently ground into various sized agglomerates, each agglomerate being strong and hard and containing a plurality of fused particles.

It is desirable, but not necessary, to adjust the depth of the static bed such that one dimension of the final agglomerates will be fixed. Normally the beds will be spread to a depth of less than 1 inch. This will enable the fused sheet to be readily ground in conventional milling equipment. Additionally, the use of thin beds will enable a short residence time within the agglomeration zone. When employing a continuous process it will not be practical to work with static beds in excess of about 0.75 inches.

The process of this invention is particularly useful for agglomerating soluble coffee since it has been found that conventional spray dried coffee powder may be formed into hard agglomerates which resemble chunky freeze dried coffee. Other suitable pulverulent materials or mixtures of materials such as sugars and powdered beverage mixes may also be readily agglomerated in accordance with this invention.

The pulverulent starting material can comprise either free-flowing powder or granular material and is typically in the range of 20 to 350 microns. Preferably the particles should not be so small that they form a tightly-packed, non-porous static bed.

The pulverulent material is initially deposited as a bed upon a support. The supporting member may be either a porous or non-porous surface and may be either of finite (e.g. tray) or infinite (e.g. continuous belt) length. The supporting member is then either placed into or passed through a treatment zone wherein a hot humid atmosphere contacts the static bed. The conditioning atmosphere can comprise a mixture of water vapor and hot air, or other heated gases with condensible liquids may also be employed.

Agglomeration of the static bed into a fused sheet may take place with a minimum of water being taken on by the pulverulent material. Typically less than 1.5% by weight of moisture is added to the pulverulent material in the agglomerating zone. Since the water addition is low a minimum of drying is required and it is therefore possible to both agglomerate and dry in a single compartment by virtue of a differential in conditions within the compartment.

The conditioning atmosphere is preferably circulated throughout the treatment compartment. Care must be taken, however, to maintain the velocity of the atmosphere at a low speed, usually less than 100 feet per minute, so that the pulverulent material is not disturbed from its static position. When using a porous surface, preferably the atmosphere is caused to pass down through the static bed which may be supported on a porous member. However, upward flow, or even lateral flow of conditioning atmosphere may be permitted so long as the static particles are not agitated.

When this invention is employed to agglomerate pulverulent coffee material with a low moisture content of less than 5% by weight, a steam-hot air blend having a temperature of between 200° and 300° F and a relative humidity of between 10% and 50% has been found to be desirable. Preferred conditions for other materials may differ, but the determination of such conditions will be readily ascertained by those skilled in the art.

The static bed is maintained in the conditioning atmosphere for a sufficient time to effect the desired fusion. The fused bed of particles may then be cooled and passed through a suitable grinder or comminutor where the rigid fused sheet is subdivided to desired size. Physical differences in the starting particle size, moisture and temperature of the conditioning atmosphere, bed depth and time of conditioning are among the factors which will govern the density, degree of hardness and color of the fused sheet.

This invention is further described by the following specific embodiments.

EXAMPLE 1

Spray dried instant coffee having a particle size distribution of between 40 and 325 microns and a moisture content of about 3% was spread evenly to a bed depth of 0.7 inch on a porous tray. The tray was placed in a dryer and hot humid air having a temperature of 260° F and a R.H. of 18% was blown down upon the bed at a velocity of about 80 feet per second. After a period of 20 minutes the tray was removed and allowed to cool. The coffee material was found as a hard fused sheet approximately 0.5 inch in thickness and having a relatively light color. The fused sheet was ground and sieved using 7 and 40 mesh U.S. Screens. The particles passing thru the 7 mesh screen and retained on the 40 mesh screen had a bulk density of 0.2 gms/cc., were hard, light in color and resembled commercial freeze dried coffee.

EXAMPLE 2

The spray dried coffee of Example 1 was agglomerated in a continuous manner by mechanically spreading a 0.5 inch thick bed of coffee on the surface of a continuous metal belt. This was accomplished by allowing the coffee to drop onto the belt behind a dam which was set 0.5 inch from the top of the belt. The belt with the 0.5 inch bed of coffee was passed through an open-ended enclosure where a steam-hot air mixture was introduced into one end of the enclosure and allowed to exit from the other end. The steam-hot air mixture was introduced at a velocity of about 60 feet per second and with a temperature of 250° F and a 12% R.H. Additional heat was supplied by condensing steam under the belt. The coffee was conveyed through the enclosure in 2 minutes, during which time the static bed of coffee on the belt fused into a sheet. The sheet of fused coffee while still on the belt was then passed over a section where it was cooled by circulating tap water beneath the belt. The fused and cooled sheet was removed from the belt and ground to desired size.

Having thus described the invention what is claimed is:

1. A method for agglomerating soluble coffee particles comprising the steps of:
    a. forming a static bed of less than 1 inch thickness of soluble coffee particles having a moisture content of less than 5%,
    b. contacting said static bed with an agglomerating atmosphere, consisting of humid hot air having a temperature between 200° and 300° F. and a relative humidity between 10% and 50%, for a sufficient time to make tacky the surfaces of the coffee particles while adding not more than 1.5% by weight moisture to the particles, whereby the particles are fused into a porous compacted sheet material,
    c. cooling the fused porous sheet to produce a hard, rigid sheet structure, and
    d. grinding said rigid porous sheet into a multiplicity of agglomerates, each agglomerate containing a plurality of fused particles.

2. The method of claim 1 wherein the coffee is unground spray dried coffee.

3. The method of claim 1 wherein the static bed is formed on a continuous supporting member to a depth of less than 0.75 inch and the bed is passed through an agglomerating zone.

4. The method of claim 1 wherein the agglomerating atmosphere is passed down through the static bed.

5. The method of claim 4 wherein the static bed is supported on a porous member.

* * * * *